Oct. 7, 1941.   W. R. CHAWNER   2,258,174
APPARATUS FOR CLEANING CONDUITS
Filed Jan. 22, 1940
*Fig. 1.*
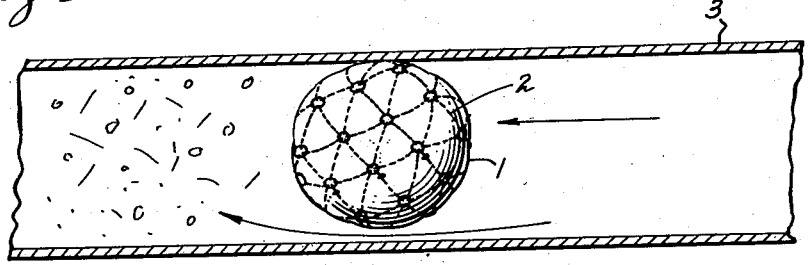
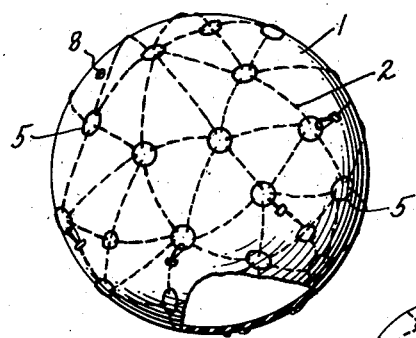
*Fig. 2.*
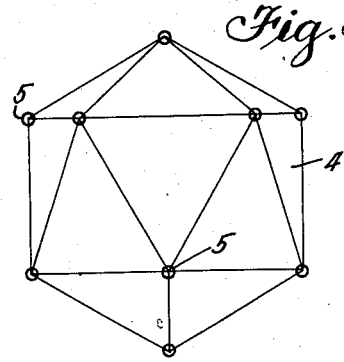
*Fig. 3.*
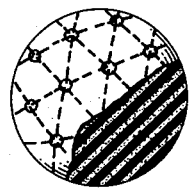
*Fig. 6*
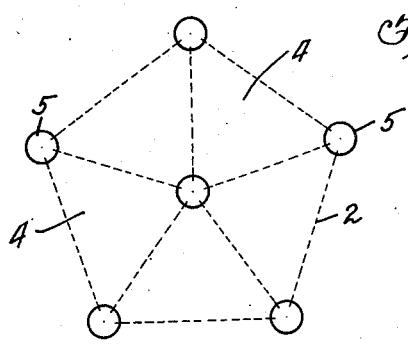
*Fig. 4.*    *Fig. 5.*
*Fig. 7*
Inventor
William Rupert Chawner
By Lyon & Lyon
Attorneys

UNITED STATES PATENT OFFICE 2,258,174

APPARATUS FOR CLEANING CONDUITS

William Rupert Chawner, Riverside, Calif.

Application January 22, 1940, Serial No. 314,982

1 Claim. (Cl. 15—104.06)

My invention relates to a means for cleaning conduits, such as pipes, culverts, etc., used for carrying water, sewage, and oil, and especially to conduits for the transportation of aqueous fluids under pressure.

In supplying water for irrigation or other uses, concrete, iron, or clay pipes are used. Because of the porous nature and leaks at the joints and elsewhere in these pipes, roots of trees and other vegetation are able to gain access to the interior of the pipes, where these roots quickly multiply and clog the pipes. All water supply pipes of this type become partially clogged with silt, and metal pipes have rust blisters and scale which decrease the size of the bore. Because of the loss in size of bore, the efficiency of the pipe line is greatly decreased, and prior to my invention this has caused serious losses, particularly to irrigation districts.

The only known means of cleaning these pipes has been for a man to crawl through the pipes and chop out the roots or push or pull a tool through the pipe. This necessitated a "shutdown" and large expense. As shut-downs by the irrigation companies are only possible during the rainy months of the year, much larger pipes must be used to get sufficient volume of water than if the pipes could be cleaned regularly.

In carrying out my invention, a compressible ball having a metallic chain or other suitable armature of a scrubbing or cutting nature around its surface may be placed in a pipe and forced through the pipe by the pressure of the fluid therein. This instrument must be slightly smaller than the pipe in order that it may rotate therein. The ball and metallic chain will be more fully described hereinafter. The ball and metallic chain will cut the roots, which are then washed out of the pipe by the fluid pressure. Sometimes a pipe line is partially crushed, or dents are caused thereon which constrict the size of the pipe. As my cleaning apparatus is of a compressible nature, the force of the fluid in the pipe will compress it and allow it to pass any of these constrictions.

I have found it often desirable to vary the specific gravity of the ball when it is inserted in a pipe line. This may be accomplished by filling the ball with gas, liquid, or a solid; that is, air, water or buckshot. This changes the rotation of the ball. For instance, when the ball is of a lighter specific gravity than the medium in the pipe it rolls along the top of the pipe; when the ball is of specific gravity approximately the same as the medium in the pipe, it slides along the pipe, and when it is of heavier specific gravity than the medium in the pipe, it rolls along the bottom of the pipe. If a more definite sliding action is required, two balls may be linked together. If it is desired to clean off a heavy incrustation of scale, any tool or scraper commonly known in the art may be attached behind the ball and propelled through the pipe by means of the ball.

My device functions to clean a pipe with a very little differential in pressure. The pressures required to actuate my device vary from a few feet of head, say one to two pounds per square inch, upwards according to the nature of the obstruction. Most common irrigation pipes will not stand an internal pressure of much more than four pounds to the square inch.

It is an object of my invention, therefore, to produce a means whereby, without closing down, a pipe may be cleaned of roots, silt, scale and blisters.

Another object of my invention is to produce an apparatus for cleaning conduit which can be inexpensively manufactured and used.

Another object is to produce an instrument for cleaning pipes which is readily adjustable in size, and inexpensive to manufacture.

Another object is to produce an instrument for cleaning pipes which is readily adjustable to accommodate the types of obstructions in the pipe.

Another object is to produce an instrument for cleaning pipes which requires very little differential in pressure to actuate the instrument.

Other objects and advantages of my invention will be apparent from the accompanying drawing.

In the drawing:

Fig. 1 diagrammatically illustrates the method of operation of my invention and shows a cross section of a pipe with an instrument for cleaning it inserted therein.

Fig. 2 is a schematic view of a ball with a metallic chain cover, schematically shown.

Fig. 3 is a view showing the 20-sided pattern of the metallic chain.

Fig. 4 is a view illustrating the basic triangular structure of the metallic chain.

Fig. 5 is a view illustrating the means of filling out the basic triangular structure of Fig. 4.

Fig. 6 is a view of a modified form of pipe cleaning ball, sectioned in part to disclose a solid rubber construction.

Fig. 7 is a fragmentary view showing a portion of the device of Fig. 2 in section.

In order to clean out a pipe full of roots, silt, scale or blisters, it is necessary that this impediment be cut free and removed from the pipe. To accomplish this result, I use a rubber ball 1 covered with a metallic chain 2. I prefer to use one of the well known beach balls which are hollow rubber spheres, as this type of ball is readily procurable in various sizes.

With the chain 2, to be more fully described in the preferred form of my invention, in place on the ball 1, the ball is inserted in a pipe 3 of slightly larger internal diameter than the ball and chain combined. This ball 1 is forced through the pipe by the pressure of the fluid behind it and because of its nature will roll through the pipe against the upper surface of the pipe 3, permitting the metallic chain to cut roots and silt, etc., off the pipe. As this ball 1 is only slightly smaller than the pipe 3, the fluid will back up behind the ball, and a portion of that fluid, because of the constriction, will be accelerated in its passage underneath and around the ball, and because of this acceleration in flow will materially aid in driving the impediment along in front of the ball and prevent clogging of the pipe by the materials cut loose. As the ball is practically the same size as the pipe, and because of contact with the upper side, the force of the fluid causes the ball to rotate, permitting the chain to grind against and loosen all of the roots, silt, scale and blisters.

It is often desirable after an initial run of the ball 1 through the pipe 3 to inflate the ball to a larger diameter than the pipe, or to use a larger ball than the size of the diameter of pipe, and force this through the pipe. In this case the rubbing and cutting action is much more severe on the pipe and the scale on the sides of the pipe is removed.

In some pipe lines, because of the pumps or obstructions at the start of the line, it is impossible to put a full sized ball in its inflated condition in the pipe. The ball must be deflated, inserted in the pipe, and then inflated, thus obviating the removal of the connections on the end of the pipe. This is accomplished by the use of an inflation valve 8. Similarly, if the pipe has not been cleaned for a long period of time, the ball may cut loose such an accumulation of silt that the ball must be removed until the fluid has carried out the loosened silt. In most irrigation pipe lines, stand-pipes are used at every thousand feet where the ball may be deflated and removed.

From the above description, it will be seen that this method of cleaning pipes will not hinder the services rendered by the pipe, and it may, therefore, be cleaned as often as desirable. I have found that the use of a ball once a month or oftener, depending upon the silt content, will keep the pipe in a clean condition.

In some pipe lines the pressure is as high, or higher than one hundred pounds per square inch. In such a line a similar ball and chain as aforedescribed may be made of heavier material, and even a solid ball made of sponge rubber might be used to prevent crushing of the ball due to the high pressure. (Fig. 6.) In certain cases, it is advisable to create an internal pressure in the ball equal to that on the exterior, and thus a solid ball would not be necessary.

In some pipe lines the fluid carried thereby is injurious to rubber, and material unaffected by the fluid may be used as a wrapper 9 between the ball and the chain to protect the ball.

I have found that a wrapper of canvas, rubber, or other abrasive-resistant material between the chain and the ball, will protect the ball from punctures and add to its life.

While various forms of chain may be employed in the ball of the present invention, I prefer to employ a chain constructed as indicated in Figures 3 to 5 of the drawing. In these figures the chain is indicated as in the form of an icosahedron, or a twenty-sided figure, each side of which is in the form of an equi-lateral triangle, these equi-lateral triangles meeting at twelve common apexes where, as indicated at 5, they are joined by rings. The rings 5 provide a means by which the size of the chain may be varied in order to fit different balls or in order to fit balls with different degrees of inflation. For example, the rings 5 may be small steel rings of a diameter varying from 1 to 3 inches. Where it is desired to increase or decrease the size of the chain, the rings 5 are removed and rings of a different size substituted therefor.

While it is possible to make chain patterns in cases of certain smaller balls simply in the form of an icosahedron, in the preferred form of my invention the individual triangles 4 of the icosahedron are filled in, as indicated at 7 in Figure 5 of the drawing, by auxiliary links so as to provide a greater chain area. It is understood that each of the individual lines represented in Figures 3, 4, and 5 of the drawing is formed of any desired or preferred chain or wire structure. For example, the lines of the chain may be formed in any desired way with links, etc.

While the particular process of cleaning pipes and ball therefor herein described is well adapted to carry out the objects of the present invention it is to be understood that this invention is not limited to the particular form shown but includes all such modifications as come within the scope of the appended claim.

I claim:

An apparatus for cleaning pipe, comprising a pneumatic ball, and a mesh of heavy cleaning chains embracing the said ball, said ball being adapted to be readily inflated or deflated to facilitate insertion into the pipe and to vary the specific gravity of the apparatus as a whole to selectively clean the top or bottom of a pipe being cleaned.

WILLIAM RUPERT CHAWNER.